(12) United States Patent
Bruner et al.

(10) Patent No.: US 7,577,809 B2
(45) Date of Patent: Aug. 18, 2009

(54) CONTENT CONTROL SYSTEMS AND METHODS

(75) Inventors: Curtis H. Bruner, Longmont, CO (US); Christopher J. Squires, Westminster, CO (US); Jeffrey G. Reh, Longmont, CO (US)

(73) Assignee: Promethean Storage LLC, Longmont, CO (US)

( * ) Notice: Subject to any disclaimer, the term of this patent is extended or adjusted under 35 U.S.C. 154(b) by 355 days.

(21) Appl. No.: 11/417,095

(22) Filed: May 3, 2006

(65) Prior Publication Data

US 2007/0186062 A1  Aug. 9, 2007

Related U.S. Application Data

(63) Continuation of application No. 11/265,635, filed on Nov. 2, 2005, now abandoned.

(51) Int. Cl.
*G06F 12/00* (2006.01)

(52) U.S. Cl. .................. 711/163; 711/164; 714/6; 714/763

(58) Field of Classification Search .......... 711/163, 711/154, 164; 714/6, 763
See application file for complete search history.

(56) References Cited

U.S. PATENT DOCUMENTS

| | | | | |
|---|---|---|---|---|
| 3,916,112 A * | 10/1975 | Kalat et al. | ................. | 379/244 |
| 5,109,393 A * | 4/1992 | Saegusa | ...................... | 375/357 |
| 5,321,828 A | 6/1994 | Phillips et al. | | |
| 5,355,412 A * | 10/1994 | Kangas | ....................... | 713/161 |
| 5,388,156 A * | 2/1995 | Blackledge et al. | ........... | 726/19 |
| 5,430,738 A * | 7/1995 | Tsuda | ........................ | 714/748 |
| 5,721,873 A * | 2/1998 | Tobita et al. | ................ | 711/164 |
| 5,854,938 A * | 12/1998 | Ogi | ............................. | 712/30 |
| 6,012,146 A * | 1/2000 | Liebenow | ..................... | 726/17 |
| 6,201,811 B1* | 3/2001 | Larsson et al. | ........... | 370/310.1 |
| 6,229,712 B1* | 5/2001 | Munoz-Bustamante et al. | .......................... | 361/783 |
| 6,529,727 B1 | 3/2003 | Findikli et al. | | |
| 6,601,175 B1* | 7/2003 | Arnold et al. | ................... | 726/7 |
| 6,969,872 B2 | 11/2005 | Kim | | |
| 6,969,892 B2 | 11/2005 | Matsumoto | | |
| 7,299,399 B2 | 11/2007 | Huang | | |
| 7,353,542 B2* | 4/2008 | Shiga et al. | ................... | 726/28 |
| 7,356,756 B1 | 4/2008 | Chan et al. | | |
| 2002/0059539 A1* | 5/2002 | Anderson | ...................... | 714/6 |
| 2003/0070099 A1* | 4/2003 | Schwartz et al. | ............ | 713/202 |
| 2003/0084316 A1* | 5/2003 | Schwartz | .................... | 713/200 |
| 2003/0202199 A1* | 10/2003 | Carter et al. | ................ | 358/1.13 |
| 2003/0212911 A1* | 11/2003 | Challener et al. | ........... | 713/202 |
| 2004/0172369 A1 | 9/2004 | Persson | | |
| 2004/0250104 A1 | 12/2004 | Handa et al. | | |
| 2005/0108525 A1* | 5/2005 | Nason et al. | ................ | 713/165 |

(Continued)

FOREIGN PATENT DOCUMENTS

EP  0593305  4/1994

*Primary Examiner*—Matt Kim
*Assistant Examiner*—John P Fishburn

(57) ABSTRACT

A control system comprises an interface configured to receive a content request from a request source wherein the content request identifies content stored on a storage medium. The control system also comprises a processing system coupled to the interface and configured to process the content request to determine when the request source is a valid destination for the content based on a first identifier stored with the content. The interface is further configured to transfer the content to the request source when the request source is a valid destination.

19 Claims, 12 Drawing Sheets

U.S. PATENT DOCUMENTS

2006/0242068 A1* 10/2006 Jogand-Coulomb et al. ... 705/50
2007/0106842 A1 5/2007 Conley et al.
2007/0168292 A1* 7/2007 Jogand-Coulomb et al. ... 705/52
2007/0168564 A1 7/2007 Conley et al.

* cited by examiner

CONTENT CONTROL SYSTEMS AND METHODS

RELATED APPLICATIONS

This patent application is a continuation of patent application Ser. No. 11/265,635; filed Nov. 02, 2005 now abandoned; entitled "CONTENT CONTROL SYSTEMS AND METHODS;" and which is hereby incorporated by reference into this patent application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to content protection technologies, and in particular, to content control technologies for storage systems.

2. Description of the Prior Art

Content protection and control has become an important issue for both content providers and individual users. Content typically takes the form of digitally formatted data structures, such as simple data files, music files, video files, e-mails, word processing files, and photos, as well as other types of content. Content providers, such as multi-media companies, are often times concerned with content piracy issues and desire to limit the illicit copying and distribution of content. Individual users are often times concerned with privacy issues and desire to protect against personal harms, such as identify theft.

Most devices, such as mobile phones, personal computers, personal digital assistants, music devices, and video devices, as well as other devices, include a host system and a storage system. The storage system typically includes a storage medium and a control system. The control system is sometimes located on the host system. The control system interfaces with the host system to store and retrieve content to and from the storage medium. In addition to the host system, storage system, and control system, most devices have software that operates in accordance with a well known software model that includes an application layer, the operating system layer, and the hardware layer. The application layer is the uppermost layer in the hierarchy. The operating system typically functions to interface between the application layer and the hardware layer.

One problem with many devices is that storage systems can be easily removed from their associated host systems and ported to new host systems. This reduces the effectiveness of many prior art content protection schemes that seek to prevent unauthorized access to the host system. For example, mobile phones often times include the option of a user password to protect against the unauthorized use of the phone. In another example, network operators can remotely disable media devices, thereby preventing unauthorized access to the host system. Unfortunately, even when a user cannot gain access to a host system due to a secure login mechanism, the entire storage system can be removed from the device and ported to a new, unprotected host system.

Most software based protection schemes are also notoriously unreliable and suffer from systemic vulnerabilities. For example, software protection schemes typically utilize open memory space that can be easily hacked. In addition, most software protection schemes operate in the application layer above the operating system layer. As a result, most software protection is vulnerable due to the inherent liabilities of the operating system upon which it relies.

One prior art example of a purely software oriented approach to security involves encrypting content, such as a word processing document, with a user defined password. The content is encrypted in the application layer while resident on a host system and subsequently transferred in its encrypted form to a storage system. One problem with this method is that the content is still accessible on the storage medium, although in an encrypted form. In addition, while the user retains control over the content via the user defined password, the encrypted content can still be copied and ported to other host systems. For example, a music file stored on flash memory could be ported from a first device to another device. In the case of high value content, such as a music or movie file, the original content provider may desire to limit such capabilities.

In response to the deficiencies of software protection schemes, many hybrid hardware and software based protection schemes have been implemented in the prior art. In one example, a hardware serial number is used to identify a host system to a remote content system, such as a web server, when the host system attempts to access the remote content system. In yet another example, a private and public key pair is generated using a hardware serial number. A host system encrypts and decrypts content using the private key before sending and receiving the content to and from a remote content system. The remote content system decrypts and encrypts the content using the public key. However, neither protecting access to a remote content system from unauthorized host systems, nor encrypting content using a key derived from a hardware serial number, limits access to content once it has been legitimately downloaded to a storage system.

Another example of hybrid prior art content protection involves a specialized microcontroller designed to provide basic security-related functions to the software utilizing the microcontroller. In this prior art design, the microcontroller contains a hardwired code, such as a private key, that is used to decrypt content that has been previously encrypted with a public key. One disadvantage of this design is that the microcontroller outputs data regardless of the destination for the data. While the data may remain in an encrypted form, it becomes vulnerable to various attacks once it has left the microcontroller. In addition, such encryption and decryption processes are often times overly resource intensive and time consuming.

In yet another example of the prior art, access to a storage system is protected by a basic input output system (BIOS) enforced password. The correct password must be provided to the BIOS before the storage system can be accessed in the course of a normal boot up process. Any content that is stored on the storage system is inherently protected by a BIOS password protection scheme. A drawback is that once the BIOS receives the correct password, unfettered access is granted to the storage system and the content stored on the storage system is left unprotected.

SUMMARY OF THE INVENTION

An embodiment of the invention helps solve the above problems and other problems by providing improved control over content stored on storage mediums. In particular, an embodiment of the invention prevents content from being transferred to an unauthorized or invalid destination based on an identifier stored with the content. In this manner, content is limited to only valid destinations. In an embodiment of the invention, a control system comprises an interface configured to receive a content request from a request source wherein the content request identifies content stored on a storage medium. The control system also comprises a processing system coupled to the interface and configured to process the content request to determine when the request source is a valid destination for the content based on a first identifier stored with the content. The interface is further configured to transfer the content to the request source when the request source is a valid destination.

In an embodiment of the invention, the processing system is configured to generate a response to the content request and the interface is configured to transfer the response.

In an embodiment of the invention, the response comprises an error message when the request source is not a valid destination for the content.

In an embodiment of the invention, the response comprises invalid data when the request source is not a valid destination for the content.

In an embodiment of the invention, the processing system withholds a response when the request source is not a valid destination for the content.

In an embodiment of the invention, the interface is further configured to receive a second identifier.

In an embodiment of the invention, the processing system is configured to process the first identifier and the second identifier to determine when the request source is a valid destination for the content.

In an embodiment of the invention, the storage medium comprises a rotating storage medium.

In an embodiment of the invention, the storage medium comprises a semiconductor based storage medium.

In an embodiment of the invention, the request source comprises a host system and wherein the first identifier identifies a subsystem on the host system.

BRIEF DESCRIPTION OF THE DRAWINGS

The same reference number represents the same element on all drawings.

DETAILED DESCRIPTION OF THE PREFERRED EMBODIMENT

FIGS. 1-12 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
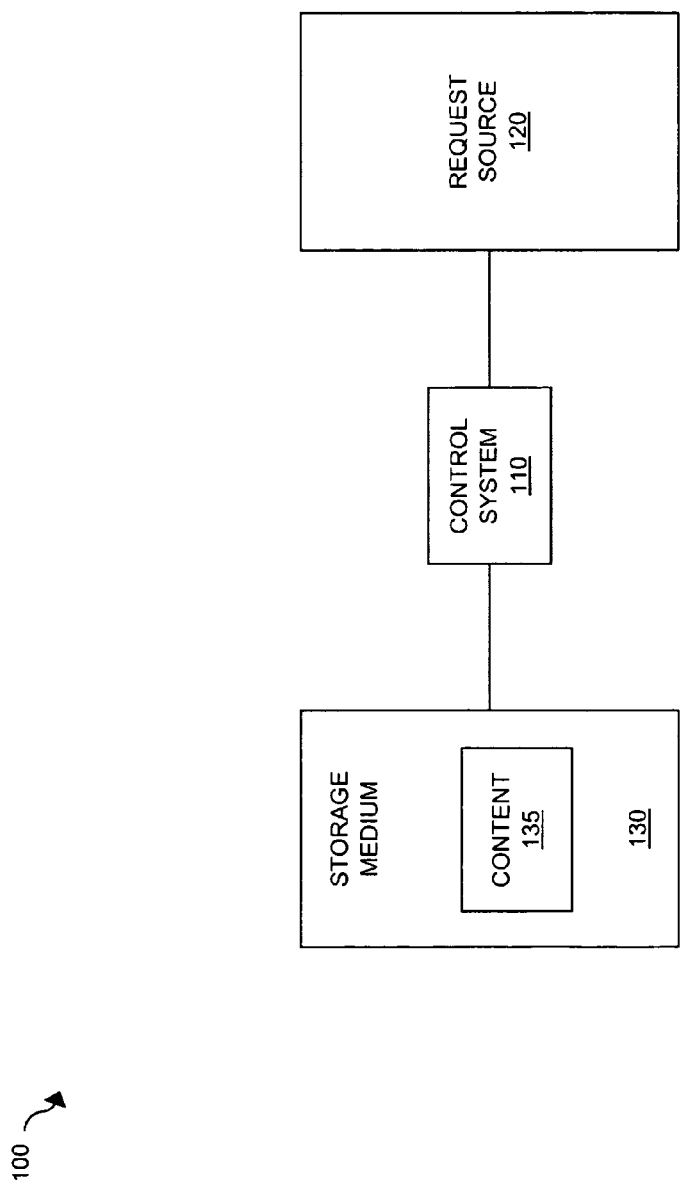
FIG. 1 illustrates a content control system in an embodiment of the invention.
Figure 2:
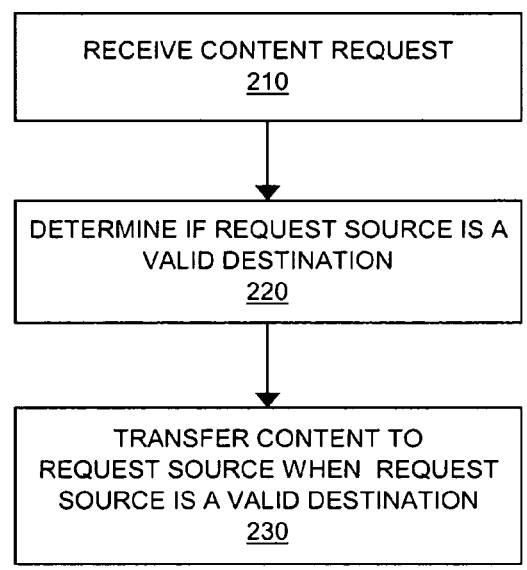
FIG. 2 illustrates the operation of a control system in an embodiment of the invention.

First Embodiment Configuration and Operation—FIGS. 1-2

FIG. 1 illustrates content control system 100 in an embodiment of the invention. Content control system 100 includes control system 110, storage medium 130, and request source 120. Content 135 is stored on storage medium 130. Control system 110 is operatively coupled to storage medium 130 and request source 120. Control system 110 could be any control system capable of controlling the storage and retrieval of content to and from storage medium 130. Request source 120 could be any system capable of requesting content from storage medium 130. Storage medium 130 could be any type of storage medium capable of storing content 135.

FIG. 2 illustrates process 200 describing the operation of control system 110 in an embodiment of the invention. To begin, control system 110 receives a content request from request source 120 (Step 210). The content request identifies content 135. Next, control system 110 processes the content request to determine whether or not request source 120 is a valid destination for content 135 based on a first identifier stored with content 135 (Step 220). Control system 110 transfers the content to the request source when the request source is a valid destination (Step 230).

In one example, control system 110 processes the first identifier along with a second identifier to determine whether or not request source 120 is a valid destination for content 135. In a valid case, control system 110 could transfer content 135 to request source 120. In one example of an invalid case, control system 110 could provide an error message to request source 120. In another example of an invalid case, control system 110 could provide invalid data to request source 120. In yet another example, control system 315 could withhold a response entirely.

In another example, control system 110 could initially receive content 135 from a content source. Control system 110 could also receive the first identifier. Control system 110 could then transfer content 135 and the first identifier to storage medium 130 for storage. In such a case, control system 110 could process the first identifier with the second identifier to determine when request source 120 is a valid destination for content 135. The first identifier could be appended or prepended to content 135 when stored with content 135. In another example, content 135 could be encoded with the first identifier. In yet another example, the first identifier could be stored separately from content 135. In yet another example, the first identifier could be stored in a different storage medium than content 135. Other ways of storing the first identifier with content 135 are possible.

Content control system 100 advantageously provides for controlling access to content 135 stored on storage medium 130. In particular, a request source that is attempting to retrieve content 135 from storage medium 130, such as request source 120, must be a valid destination for content 135. Whether or not the request source is a valid destination is determined based on a first identifier that is stored with content 135.

Second Embodiment Configuration and Operation—FIGS. 3-6

Figure 3:
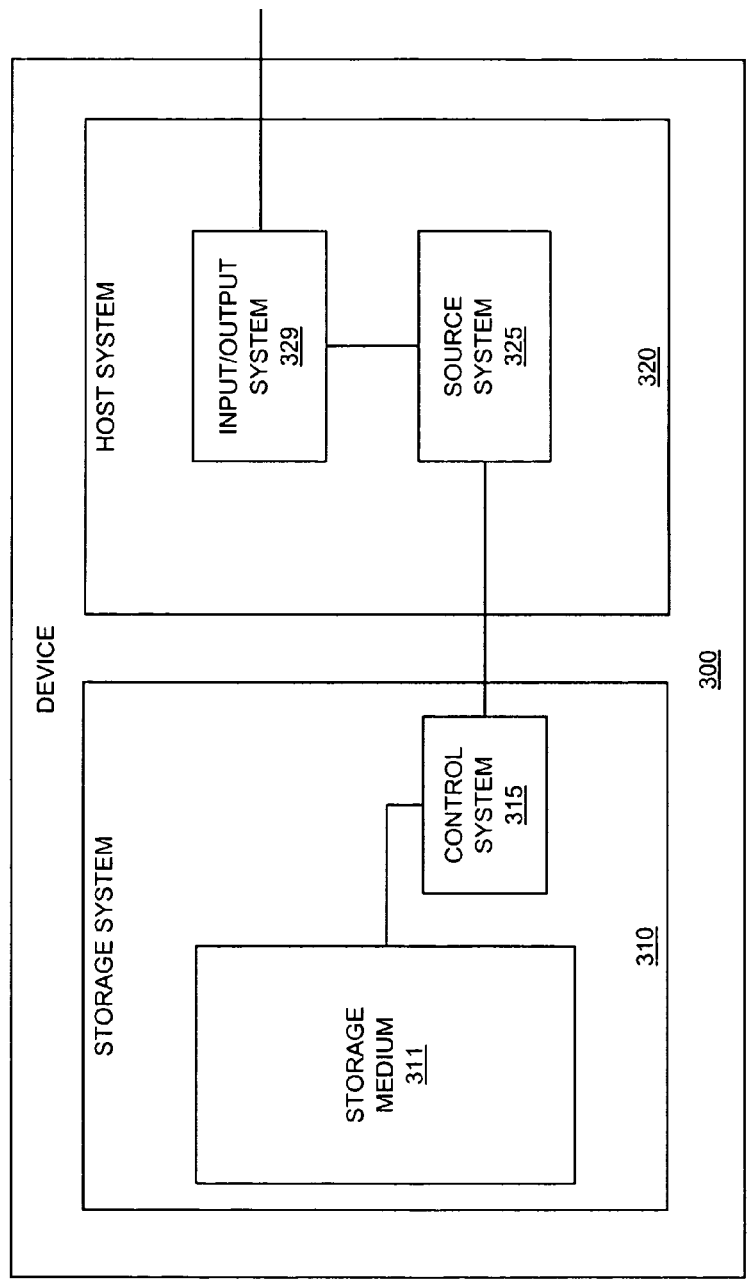
FIG. 3 illustrates a device in an embodiment of the invention.

FIG. 3 illustrates device 300 in an embodiment of the invention. Device 300 could be, for example, a mobile phone, a music device, a video device, or a personal computing device, as well as other types of devices. Device 300 includes storage system 310 and host system 320. Storage system 310 includes storage medium 311 and control system 315. Host system 320 includes input/output (I/O) system 329 and source system 325. Other elements are possible, such as a system bus, but are not shown for the sake of clarity.

Storage medium 311 could be any storage medium capable of storing content. For example, storage medium 311 could be a rotating storage medium, semiconductor memory, biological memory, or tape storage, as well as other types of storage mediums. An example of a rotating storage medium is a hard disk. An example of semiconductor memory is flash memory.

I/O system 329 could be any system capable of interfacing between source system 325 and other elements of host system 320 or external to host system 320. For example, I/O system 329 could provide a user interface or a data interface, as well as other types of interfaces. In another example, I/O system 329 could provide an interface to a remote content system, such as a web server.

Source system 325 could be any system capable of processing content stored on storage medium 311. Source system 325 could comprise a single integrated system. Source system 325 could also comprise multiple integrated systems or subsystems. Source system 325 could be identified by an identifier associated with source system 325 or any subsystem of source system 325. For example, an integrated chip in source system 325 could be encoded with an identifier during the manufacturing process. Other types of identifiers are possible.

Figure 4:
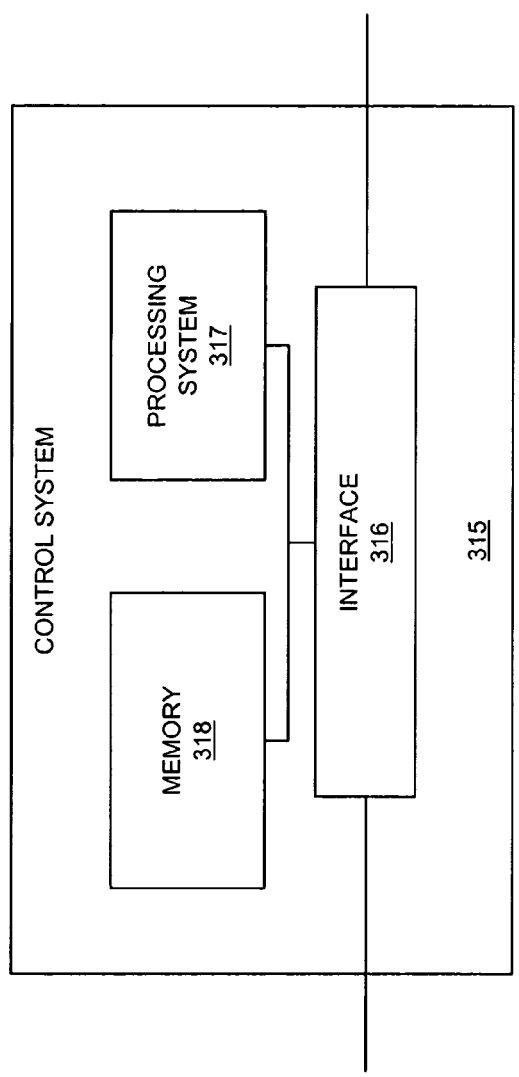
FIG. 4 illustrates a control system in an embodiment of the invention.

FIG. 4 illustrates control system 315 in an embodiment of the invention. Control system 315 could be any control system capable of controlling content storage and retrieval to and from storage medium 311. Control system 315 includes interface 316 coupled to processing system 317 and memory 318. Memory 318 is also coupled to processing system 317. Memory 318 is illustrated as internal to control system 315. However, it should be understood that memory could 318 could be external to control system 315. Interface 316, processing system 317, and memory 318 could be comprised of special purpose circuitry, software, hardware, or firmware, as well as other types of processing elements. Interface 316 is any interface capable of interfacing between storage mediums, such as storage medium, and source systems, such as source system 325. Processing system 317 is any processing system capable of processing data received into interface 316, such as content, content requests, or identifiers, as well as other types of data.

Figure 5:
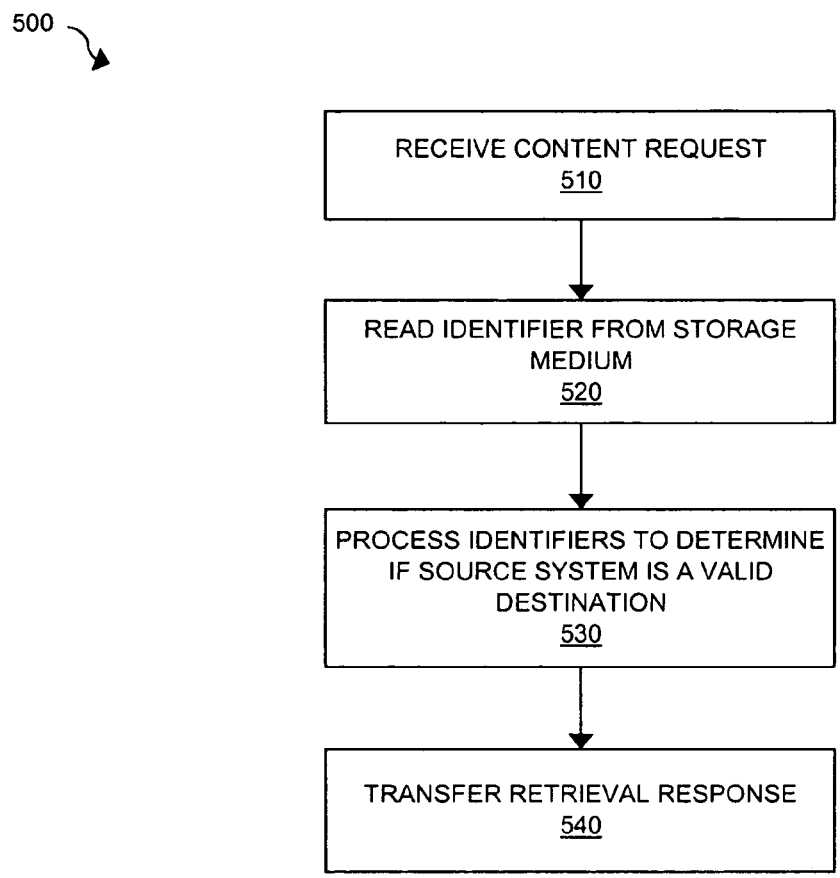
FIG. 5 illustrates the operation of a device in an embodiment of the invention.

FIG. 5 illustrates process 500 describing the operation of device 300 in an embodiment of the invention. In operation, control system 315 receives a content request from source system 325 for content stored on storage medium 311 (Step 510). The request identifies the content by, for example, memory location. Control system 315 responsively reads from storage medium 311 a first identifier stored in association with the requested content (Step 520). Next, control system 315 processes the first identifier with a second identifier to determine whether or not source system 325 is a valid destination for the content (Step 530). Lastly, control system 315 transfers the requested content when source system 325 is a valid destination for the content (Step 540).

Figure 6:
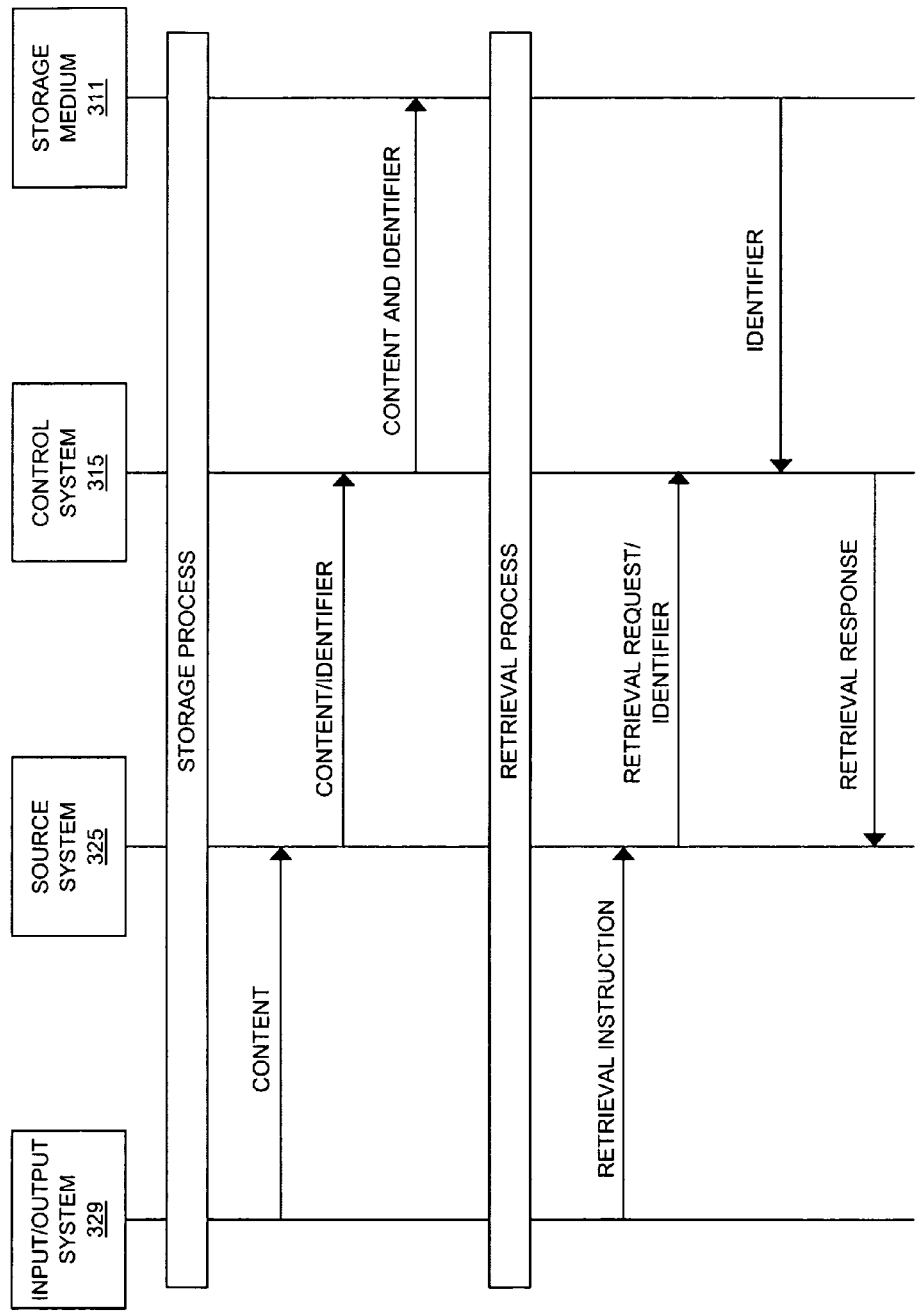
FIG. 6 illustrates the operation of a device in an embodiment of the invention.

FIG. 6 illustrates a flow diagram in an embodiment of the invention illustrating the operation of device 300. In operation, content is received into I/O system 329 from an external source. I/O system 329 transfers the content to source system 325 for storage. Source system 325 operatively communicates with control system 315 to store the content on storage medium 311. Source system 325 transfers the content to control system 315. Source system 325 also provides a first identifier to control system 315 to be stored with the content. The first identifier could be, for example, a hardware dependent signal, a command separate from the content, or by an identifier transferred along with the content. The first identifier could be accessible to control system 315 only at the hardware layer. For instance, the first identifier could be directly physically connected to control system 315. Control system 315 responsively processes the content and the identifier and transfers the processed content and identifier to storage medium 311. Storage medium 311 stores the content with the identifier. The identifier could be embedded with the request content. In another example, the identifier could be appended or prepended to the content. In yet another example, a pointer to the identifier could be stored with the content. Other variations are possible.

Further in operation, I/O system 329 receives a retrieve command to retrieve content from storage medium 311. The retrieve command could be, for example, a user command or a remote server command, as well as other types of retrieve commands. I/O system 329 directs source system 325 to retrieve the content from storage medium 311. Source system 325 responsively transfers a retrieval request to control system 315. Source system 325 could be identified to control system 315 by a second identifier, such as a hardware dependent signal, a command separate from the content request, or by an identifier included in the retrieval request. It should be understood that the content request and the second identifier could be provided by separate subsystems of source system 325. Alternatively, the cont request and the second identifier could be provided by the same subsystem of source system 325. Furthermore, it should be understood that the second identifier could be provided by a system external to source system 325.

Control system 315 receives the retrieval request and processes the request to access and read the first identifier stored on storage medium 311. Control system 315 could read all of or only portions of the requested content in order to read the first identifier. In such as case, the necessary content could be buffered in memory 318. In another example, just the first identifier could be read from storage medium 311. Control system 315 processes the first identifier and the second identifier to determine whether or not source system 325 is a valid destination for the stored content. Control system 315 then generates and transmits a retrieval response to source system 325.

In a valid case, control system 315 could transfer the content to source system 325. In one example of an invalid case, control system 315 could provide an error message to source system 325. In another example of an invalid case, control system 315 could provide invalid data to source system 325. In yet another example of an invalid case, control system 315 could withhold a response entirely. Further in an example of an invalid case, any content that had been buffered in memory 318 could be flushed, or otherwise written over or erased.

Third Embodiment Configuration and Operation—FIGS. 7-10

Figure 7:
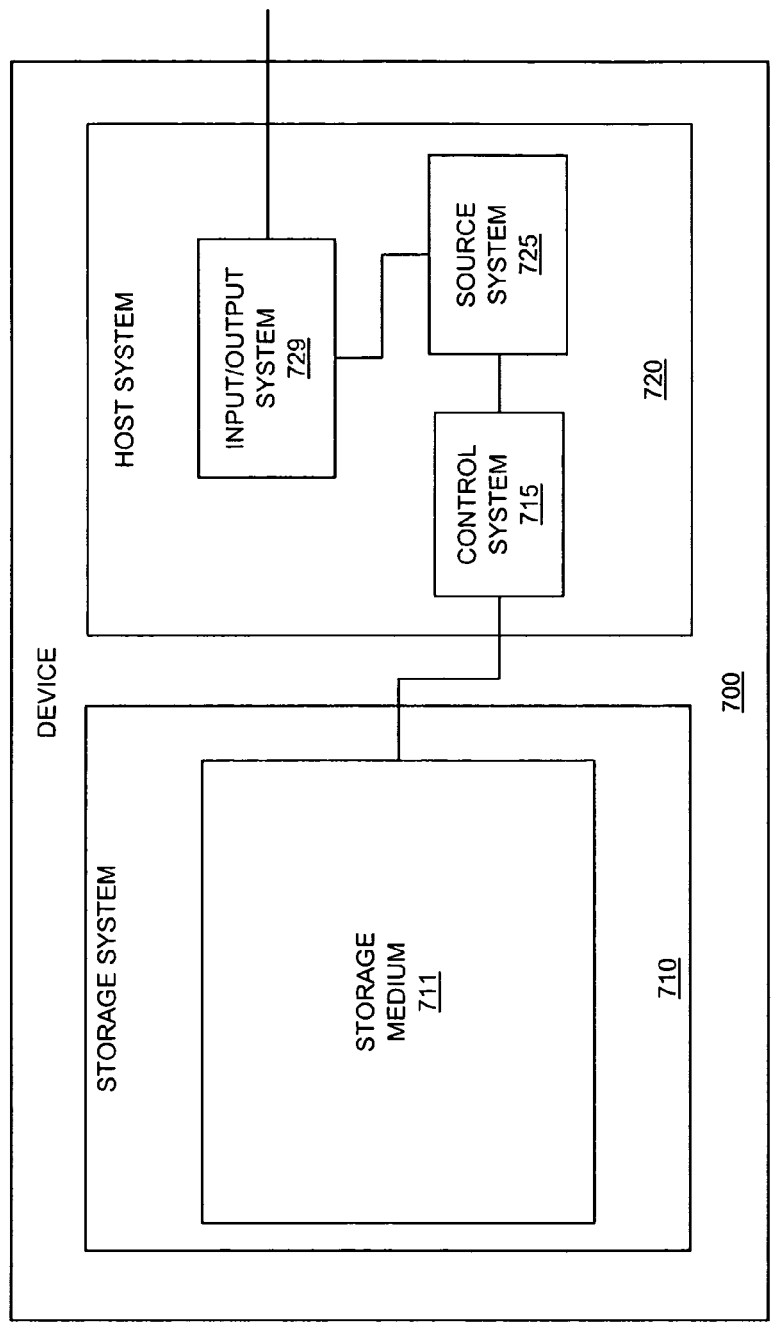
FIG. 7 illustrates a device in an embodiment of the invention.

FIG. 7 illustrates device 700 in an embodiment of the invention. Device 700 could be, for example, a mobile phone, a music device, a video device, or a personal computing device, as well as other types of devices. Device 700 includes storage system 710 and host system 720. Storage system 710 includes storage medium 711. Host system 720 includes input/output (I/O) system 729, source system 725, and control system 715. It should be understood that the elements of host system 720 could be implemented as individual systems, such as integrated chips or microcontrollers. It should also be understood that the elements of host system 720 could be implemented as a reduced number of integrated systems, such as a single integrated chip. Other elements are possible, such as a system bus, but are not shown for the sake of clarity.

Storage medium 711 could be any storage medium capable of storing content. For example, storage medium 711 could be a rotating storage medium, semiconductor memory, biological memory, or tape storage, as well as other types of storage mediums. An example of a rotating storage medium is a hard disk. An example of semiconductor memory is flash memory.

I/O system 729 could be any system capable of interfacing between source system 725 and other elements of host system 720 or external to host system 720. For example, I/O system 729 could provide a user interface or a data interface, as well as other types of interfaces. In another example, I/O system 729 could provide an interface to a remote content system, such as a web server.

Source system 725 could be any system capable of processing content stored on storage medium 711. Source system 725 could comprise a single integrated system. Source system 725 could also comprise multiple integrated systems or subsystems. Source system 725 could be identified by an identifier associated with source system 725 or any subsystem of source system 725. For example, an integrated chip in source system 725 could be encoded with an identifier during the manufacturing process. Other types of identifiers are possible.

Figure 8:
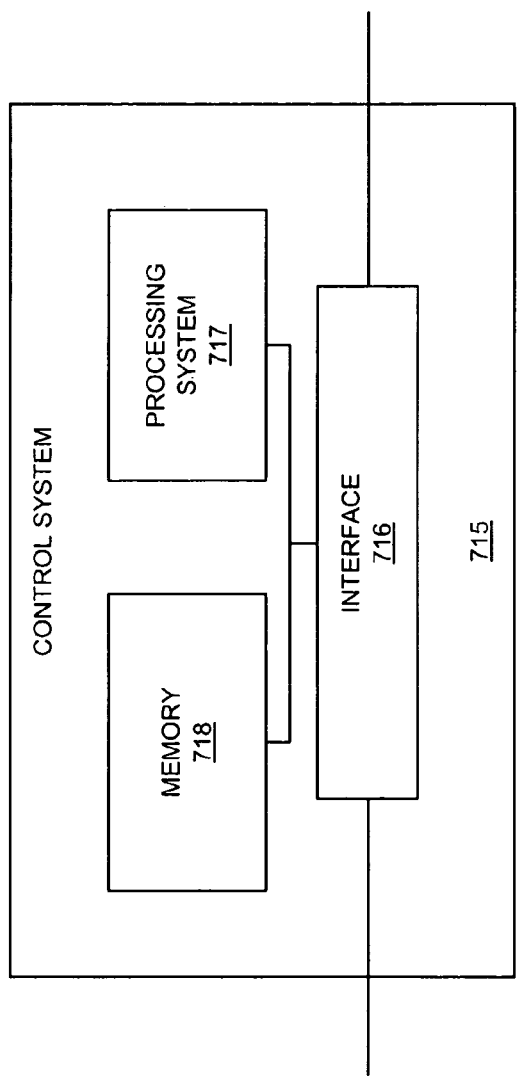
FIG. 8 illustrates a control system in an embodiment of the invention.

FIG. 8 illustrates control system 715 in an embodiment of the invention. Control system 715 could be any control system capable of controlling content storage and retrieval to and from storage medium 711. Control system 715 includes interface 716 coupled to processing system 717 and memory 718. Memory 718 is also coupled to processing system 717. Memory 718 is illustrated as internal to control system 715. However, it should be understood that memory could 718 could be external to control system 715. Interface 716, processing system 717, and memory 718 could be comprised of special purpose circuitry, software, hardware, or firmware, as well as other types of processing elements. Interface 716 could be any interface capable of interfacing between storage media, such as storage medium 711, and source systems, such as source system 725. Processing system 717 is any processing system capable of processing data received into interface 716, such as content, content requests, or identifiers, as well as other types of data.

Figure 9:
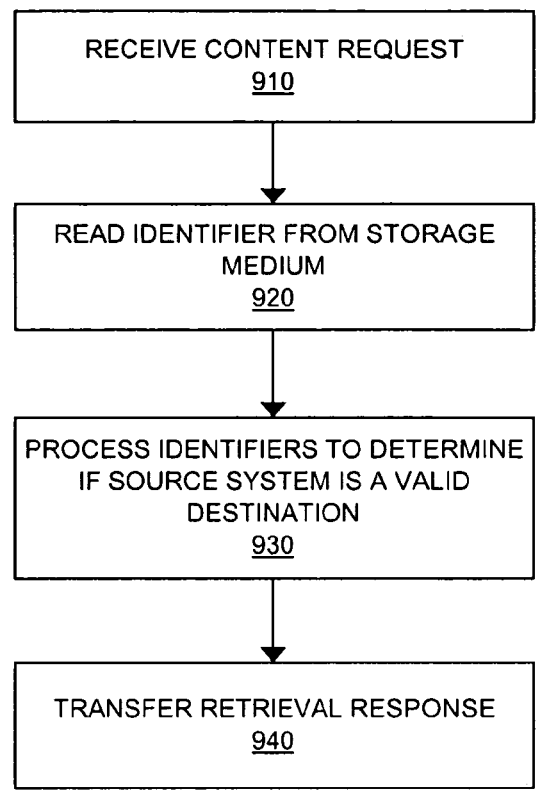
FIG. 9 illustrates the operation of a device in an embodiment of the invention.

FIG. 9 illustrates process 900 describing the operation of device 700 in an embodiment of the invention. In operation, control system 715 receives a content request from source system 725 for content stored on storage medium 711 (Step 910). The request identifies the content by, for example, memory location. Control system 715 responsively reads from storage medium 711 a first identifier stored in association with the requested content (Step 920). Next, control system 715 processes the first identifier with a second identifier to determine whether or not source system 725 is a valid destination for the content (Step 930). Control system 715 then transfers the requested content when source system 725 is a valid destination for the content (Step 940).

Figure 10:
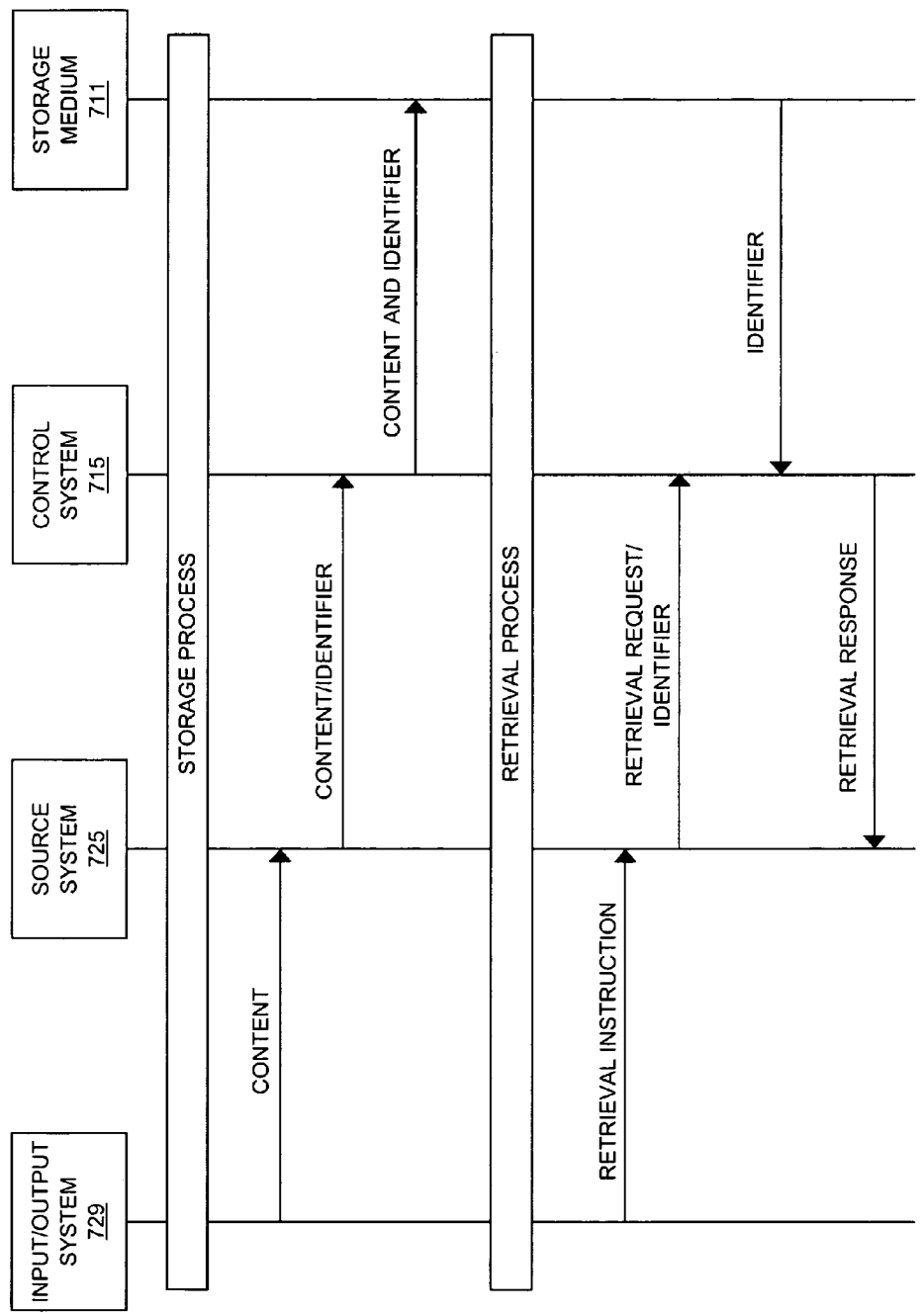
FIG. 10 illustrates the operation of a device in an embodiment of the invention.

FIG. 10 illustrates a flow diagram in an embodiment of the invention describing the operation of device 700. In operation, content is received into I/O system 729 from an external source. I/O system 729 transfers the content to source system 725 for storage. Source system 725 operatively communicates with control system 715 to store the content on storage medium 711. Source system 725 transfers the content to control system 715. Source system 725 also provides a first identifier to control system 715 to be stored with the content. The first identifier could be, for example, a hardware dependent signal, a command separate from the content, or by an identifier transferred along with the content. The first identifier could be accessible to control system 715 only at the hardware layer. For instance, the first identifier could be directly physically connected to control system 715. In another example, the first identifier could reside in control system 715.

Control system 715 responsively processes the content and the identifier and to transfer the processed content and identifier to storage medium 711. The content is then stored on storage medium 711 with the identifier. The identifier could be embedded with the stored content. In another example, the identifier could be appended or prepended to the content. In yet another example, a pointer to the identifier could be stored with the content. Other variations are possible.

Further in operation, I/O system 729 receives a retrieve command to retrieve content from storage medium 711. The retrieve command could be, for example, a user command or a remote server command, as well as other types of retrieve commands. I/O system 729 directs source system 725 to retrieve the content from storage medium 711. Source system 725 responsively transfers a retrieval request to control system 715. Source system 725 could be identified to control system 715 by a second identifier, such as a hardware dependent signal, a command separate from the content request, or by an identifier included in the retrieval request. The second identifier could be accessible to control system 715 only at the hardware layer. For instance, the first identifier could be directly physically connected to control system 715.

It should be understood that the content request and the second identifier could be provided by separate subsystems of source system 725. Alternatively, the content request and the second identifier could be provided by the same subsystem of source system 725. In another alternative, the second identifier could reside on control system 715. Furthermore, it should be understood that the second identifier could be provided by a system external to both source system 725 and control system 315.

Control system 715 receives the retrieval request and processes the request to access and read the first identifier stored on storage medium 711. Control system 715 could read all of or only portions of the requested content in order to read the first identifier. In either case, the content could be buffered in memory 718. In another example, just the first identifier could be read from storage medium 711. Control system 715 processes the first identifier and the second identifier to determine whether or not source system 725 is a valid destination for the stored content. Control system 715 then generates and transmits a retrieval response to source system 725.

In a valid case, control system 715 could transfer the content to source system 725. In one example of an invalid case, control system 715 could provide an error message to source system 725. In another example of an invalid case, control system 715 could provide invalid data to source system 725. In yet another example of an invalid case, control system 715 could withhold a response entirely. Further in an example of an invalid case, any content that had been buffered in memory 718 could be flushed, or otherwise written over or erased.

Figure 11:
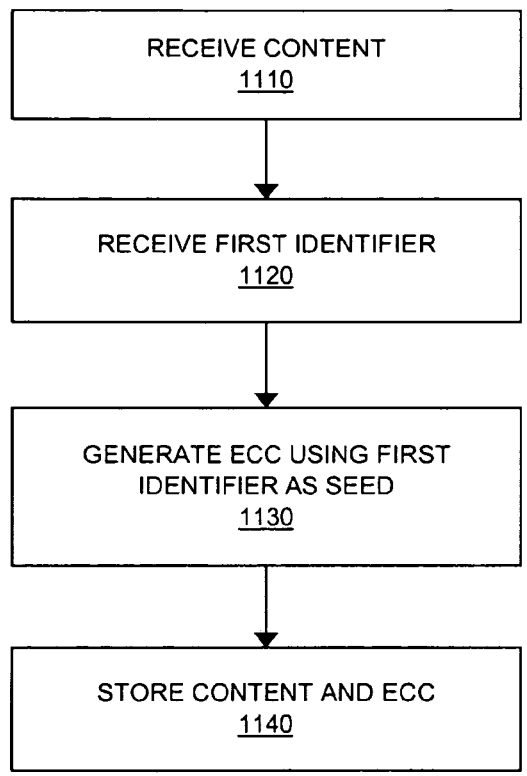
FIG. 11 illustrates the operation of a control system in an embodiment of the invention.
Figure 12:
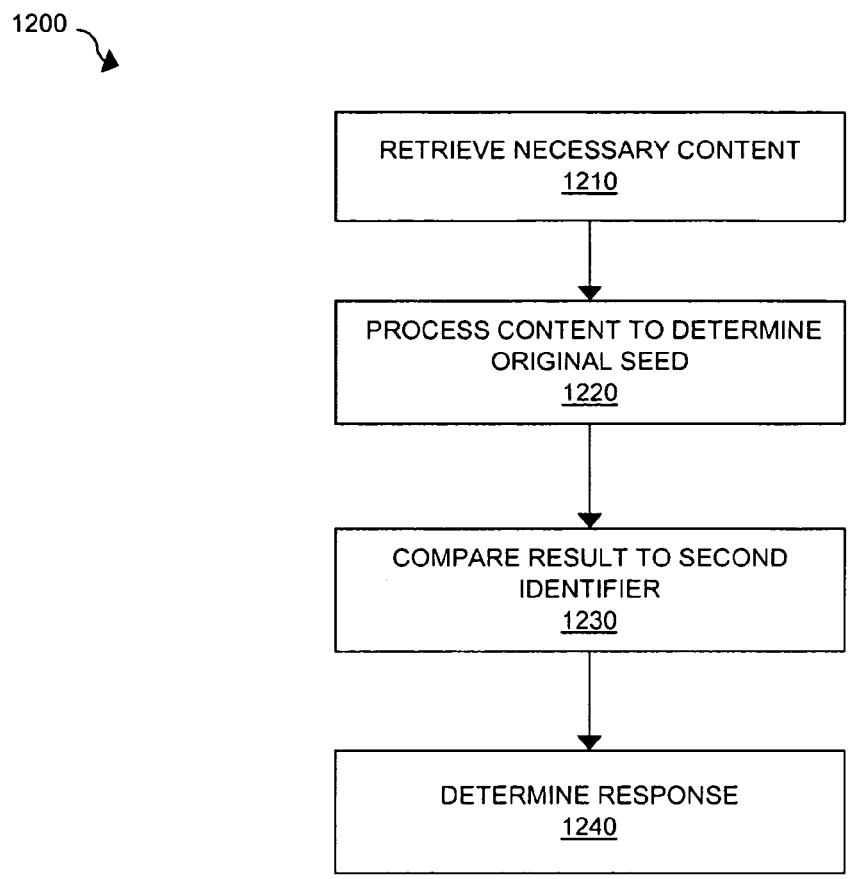
FIG. 12 illustrates the operation of a control system in an embodiment of the invention.

Fourth Embodiment—FIGS. 11 and 12

FIG. 11 illustrates the operation of a control system in an embodiment of the invention whereby a process for storing an identifier with content is described. An example of a control system could be control system 110, 315, or 715. To begin, a control system receives content to be stored on a storage medium (Step 1110). The control system also receives a first identifier (Step 1120). Depending upon the size of the content, the content could comprise a single block or multiple blocks. Next, the control system processes at least a first block of content and the first identifier to generate an error correction code (ECC) for at least the first block (Step 1130). The first identifier could be used as a seed by an ECC generation process. Other inputs could be used in addition to the first identifier, such as a memory address. The resulting block of content comprises encoded content and the ECC. The block is then stored on the storage medium (Step 1140). The above process could be repeated as necessary to process and store the entirety of the content.

FIG. 12 illustrates the operation of a control system in an embodiment of the invention whereby a process for retrieving an identifier and checking the identifier against a second identifier is described. An example of a control system could be control system 110, 315, or 715. To begin, the control system retrieves the necessary content from a storage medium (Step 1210). For example, a single block could be retrieved. The block could comprise encoded content and an ECC. Next, the block is processed to determine the original seed used to generate the ECC (Step 1220). For example, the block could be processed through a reverse ECC generation process. The result is compared to a second identifier used to identify a request source (Step 1230). Depending upon the comparison result, the control system generates and provides a response (Step 1240).

Advantageously, the above described systems and methods provide for improved access control over stored content. In particular, content that is stored on a storage medium is protected from transport from the storage medium to an invalid destination. Determining whether or not a destination is valid is accomplished by processing an identifier stored with the requested content. In some cases, the identifier is processed with a second identifier provided by the requesting system to determine whether or not the requesting system is a valid destination for the content.

What is claimed is:

1. A control system comprising:
   an interface configured to receive a content request and an identifier from a request source wherein the content request identifies content stored on a storage medium;
   a processing system coupled to the interface and configured to process the content request to determine an error correction code (ECC) stored with the content, determine an ECC seed based on the content and the ECC, wherein the ECC seed was used to generate the ECC, and process the content request, the identifier, and the ECC seed to determine when the request source is a valid destination for the content; wherein the request source is a valid destination when the ECC seed corresponds to the identifier; and
   the interface configured to transfer the content to the request source when the request source is a valid destination.

2. The control system of claim 1 wherein the processing system is configured to generate a response to the content request and wherein the interface is configured to transfer the response.

3. The control system of claim 2 wherein the response comprises an error message when the request source is not a valid destination for the content.

4. The control system of claim 2 wherein the response comprises invalid data when the request source is not a valid destination for the content.

5. The control system of claim 1 wherein the processing system withholds a response when the request source is not a valid destination for the content.

6. The control system of claim 1 wherein the storage medium comprises a rotating storage medium.

7. The control system of claim 1 wherein the storage medium comprises a semiconductor based storage medium.

8. The control system of claim 1 wherein the request source comprises a host system and wherein the ECC seed identifies a subsystem on the host system.

9. A method of operating a control system comprising:
   receiving a content request and an identifier from a request source wherein the content request identifies content stored on a storage medium;
   processing the content request to determine an error correction code (ECC) stored with the content;
   processing the content and the ECC to determine an ECC seed, wherein the ECC seed was used to generate the ECC;
   processing the content request, the identifier, and the ECC seed to determine when the request source is a valid destination for the content; wherein the request source is a valid destination when the ECC seed corresponds to the identifier; and
   transferring the content to the request source when the request source is a valid destination.

10. The method of claim 9 comprising generating a response to the content request and transferring the response.

11. The method of claim 10 wherein the response comprises an error message when the request source is not a valid destination for the content.

12. The method of claim 10 wherein the response comprises invalid data when the request source is not a valid destination for the content.

13. The method of claim 9 further comprising withholding a response when the request source is not a valid destination for the content.

14. The method of claim 9 wherein the storage medium comprises a rotating storage medium.

15. The method of claim 9 wherein the storage medium comprises a semiconductor based storage medium.

16. The method of claim 9 wherein the request source comprises a host system and wherein the ECC seed identifies a subsystem on the host system.

17. A storage system comprising:
   a storage medium configured to store content; and
   a control system coupled to the storage medium and configured to receive a content request and an identifier from a request source wherein the content request identifies content stored on a storage medium, process the content request to determine an error correction code (ECC) stored with the content, determine an ECC seed based on the content and the ECC, wherein the ECC seed was used to generate the ECC, and process the content request, the identifier, and the ECC seed to determine when the request source is a valid destination for the content, wherein the request source is a valid destination when the ECC seed corresponds to the identifier, and transfer the content to the request source when the request source is a valid destination.

18. A device comprising:

a host system; and a storage system coupled to the host system and configured to receive a content request and an identifier from a request source wherein the content request identifies content stored on a storage medium, process the content request to determine an error correction code (ECC) stored with the content, determine an ECC seed based on the content and the ECC, wherein the ECC seed was used to generate the ECC, and process the content request, the identifier, and the ECC seed to determine when the request source is a valid destination for the content, wherein the request source is a valid destination when the ECC seed corresponds to the identifier, and transfer the content to the request source when the request source is a valid destination.

19. A device comprising:

a storage system having a storage medium; and a host system coupled to the storage system and comprising a control system configured to receive a content request and an identifier from a request source wherein the content request identifies content stored on the storage medium, process the content request to determine an error correction code (ECC) stored with the content, determine an ECC seed based on the content and the ECC, wherein the ECC seed was used to generate the ECC, and process the content request, the identifier, and the ECC seed to determine when the request source is a valid destination for the content, wherein the request source is a valid destination when the ECC seed corresponds to the identifier, and transfer the content to the request source when the request source is a valid destination.

* * * * *